United States Patent
Kanai

(10) Patent No.: US 6,377,409 B2
(45) Date of Patent: *Apr. 23, 2002

(54) PRISM AND VIEWING OPTICAL SYSTEM USING THE PRISM

(75) Inventor: Moriyasu Kanai, Tokyo (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,186

(22) Filed: Dec. 3, 1997

(30) Foreign Application Priority Data

Dec. 4, 1996 (JP) ............................................. 8-338991

(51) Int. Cl.[7] .......................... G02B 5/04; G02B 23/02; G02B 27/00; G03B 13/02
(52) U.S. Cl. ...................... 359/834; 359/835; 359/431; 359/614; 359/638; 396/384
(58) Field of Search ................................ 359/614, 833, 359/834, 613, 835, 431, 636, 638; 396/384

(56) References Cited

U.S. PATENT DOCUMENTS

| 703,929 A | * | 7/1902 | Ives |
| 1,509,936 A | * | 9/1924 | Douglass |
| 1,662,693 A | * | 3/1928 | Astafiev |
| 2,687,670 A | * | 8/1954 | Locquin |
| 3,230,851 A | * | 1/1966 | Reymond |
| 4,064,516 A | * | 12/1977 | McLaughlin et al. |
| 4,119,980 A | * | 10/1978 | Baker |
| RE30,513 E | * | 2/1981 | Bleukens et al. |
| 4,309,108 A | * | 1/1982 | Siebert |
| 4,533,220 A | * | 8/1985 | Kurita et al. ................ 359/640 |
| 4,555,163 A | * | 11/1985 | Wagner |
| 4,634,223 A | * | 1/1987 | Ishii ........................... 359/834 |
| 5,134,526 A | * | 7/1992 | Inabata |
| 5,243,465 A | * | 9/1993 | Fein |
| 5,668,674 A | * | 9/1997 | Kanai et al. |
| 5,790,306 A | * | 8/1998 | Kleinberg et al. |
| 5,838,504 A | * | 11/1998 | Ichikana et al. |

FOREIGN PATENT DOCUMENTS

| FR | 873654 | * | 7/1942 |
| JP | 4-60603 | * | 2/1992 |
| JP | 7-13005 | | 1/1995 |

* cited by examiner

*Primary Examiner*—Ricky D. Shafer
(74) *Attorney, Agent, or Firm*—Greenblum & Bernstein, P.L.C.

(57) ABSTRACT

Disclosed is a prism having a light incident surface, a light emerging surface, and at least one light reflection surface. The light incident on the light incident surface is reflected, inside the prism, by the light reflection surface, and emerged from the light emerging surface. At least one light reflection surface has a reflecting surface which does not satisfy a total reflection condition. A reflection area is formed on the at-least-one light reflection surface by applying light reflecting material. The reflection-area corresponds to a portion on which a normal light is incident. Further, a portion of the-at least-one reflection surface other than the reflection area is formed to be a low-reflection area-which has a lower reflectance index than the reflection area.

22 Claims, 4 Drawing Sheets

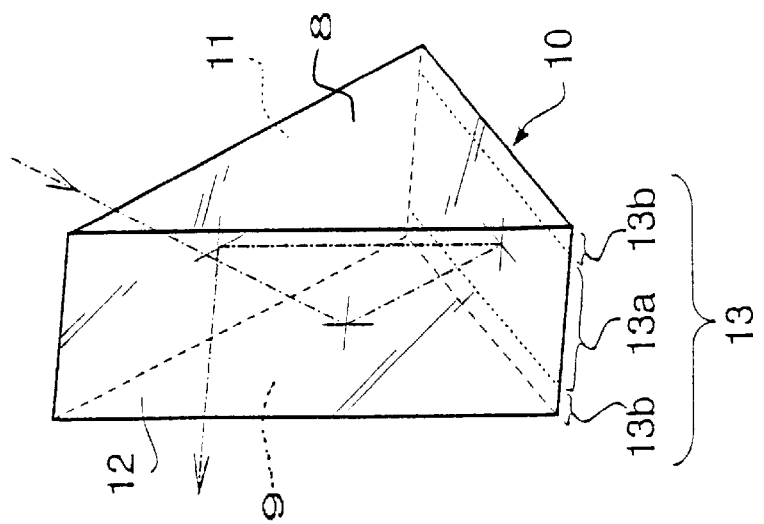
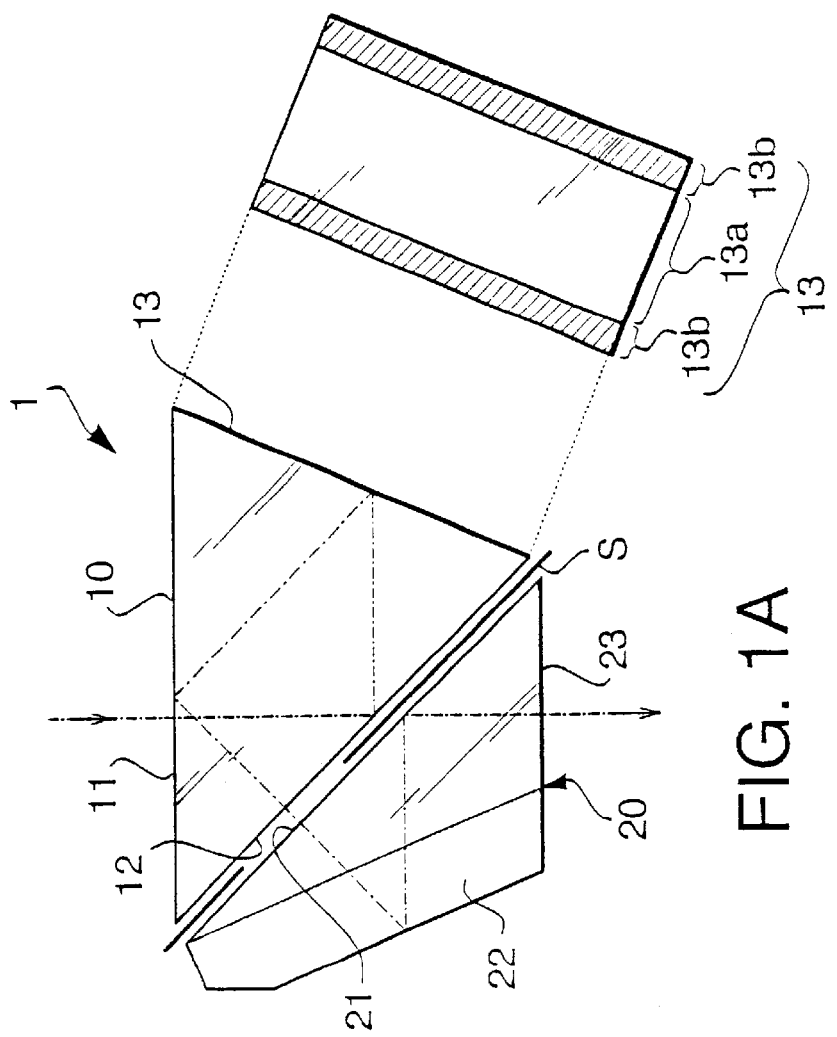
FIG. 1A
FIG. 1B
FIG. 1C

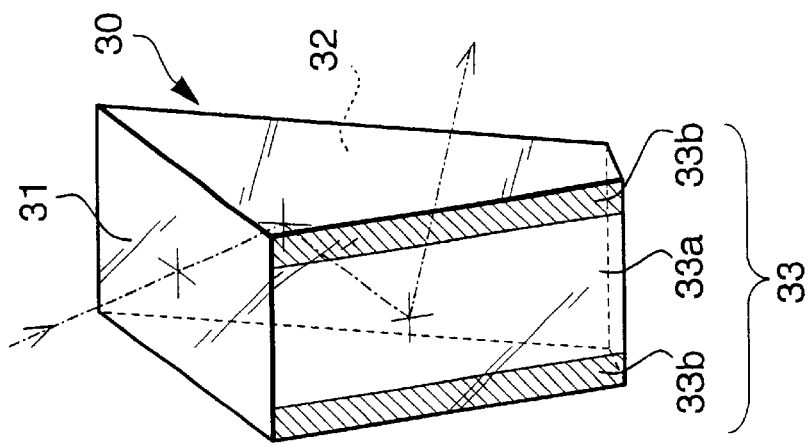
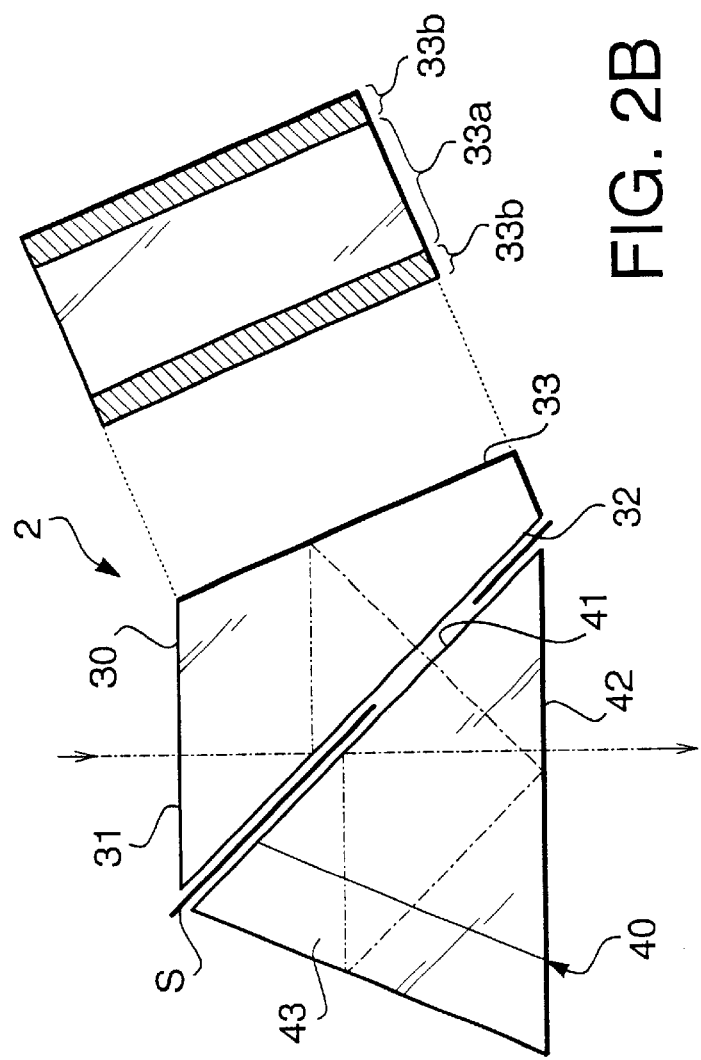
FIG. 2A  FIG. 2B  FIG. 2C

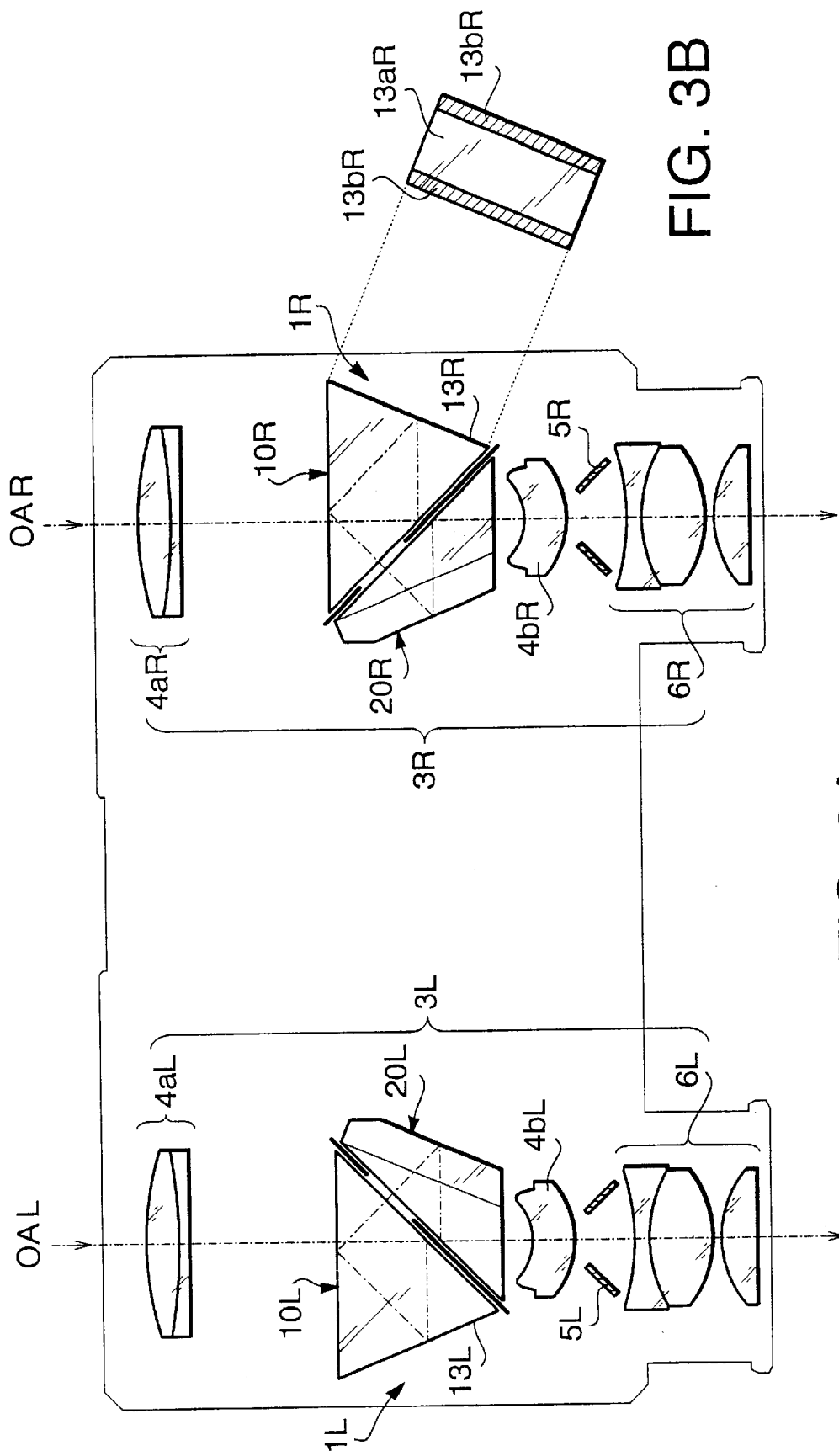

PRISM AND VIEWING OPTICAL SYSTEM USING THE PRISM

BACKGROUND OF THE INVENTION

The present invention relates to a prism for deflecting a flux of light, and a viewing optical system using the prism, such as binoculars, camera finders, or the like.

Conventionally, a prism for the viewing optical system is, in order to prevent a ghosting light, provided with an aperture member on a light emerging surface or light incident surface thereof. Further to the above, unused surfaces (surfaces which are not used for transmitting and/or reflecting light) of the prism are formed to be a rough surface having minute concave and convex portions in order to reduce reflectance thereof, and further black ink is applied thereon.

For example, in FIG. 4, a prism 100 is provided with an. aperture member 101A having an aperture opening 101 which allows light to pass therethrough. Further, unused surfaces 102 and 103 are formed to have the minute convex/concave patterns, on which a black ink is to be applied.

Conventionally, in viewing optical systems employed in binoculars, real image camera finders, or the like, prisms such as Porro prisms, roof prisms (dach prisms), penta prisms have been used as an erecting optical system. Recently, optical systems are demanded to be made compact. For this purpose, prisms are designed such that a ratio of a diameter of the flux of light to an area on which the flux of light is incident is as great as possible. In other words, it is preferable that the light transmitting surfaces and light reflecting surfaces are designed to have less marginal areas (areas where the light is not incident).

For example, as shown in FIG. 5, prism 100' which has less length in the up-and-down direction (i.e., a height), the shape of the aperture opening 101 is formed as shown in FIG. 5. In the prism 100 having a greater height as shown in FIG. 4, the aperture opening 101 has substantially a circular shape, and accordingly, the width "d" of the marginal area (i.e., a distance between the edge of the opening 101 and an unused-surface side of the aperture member 101A) is smallest at a position indicated by arrows, and is greater at positions apart from the indicated position. In the prism 100' having less height as shown in FIG. 5, within a range of "a" along the right-and-left direction in FIG. 5, the width "d" of the marginal area extends.

If such marginal areas extends within a relatively wider range along the unused surface side of the aperture member 101A, it becomes difficult to sufficiently prevent the light that is reflected on the unused surfaces, from emitting through an aperture opening 101 provided on a light emerging surface of the prism. The light which is reflected by the unused surfaces, and passed through the aperture opening is incident on eyes of a user as a ghosting light which prevents the user from viewing image to be observed.

In Japanese Patent Provisional Publication HEI 7-13005, the ghosting light is scattered by minute convex and concave portions formed on a non-unused surface (i.e., a surface where the light is incident, a surface from which the light is emitted, or a surface which reflects the light) at a portion other than a portion where a normal light (i.e., the light which proceeds a normal optical path as designed) is incident, in order to weaken the ghosting light. In the above-described publication, the minute convex and concave portions are formed on a surface which satisfies a total reflection condition (i.e., the normal light incident on the surface is totally reflected by the surface).

In the conventional prism as described above, however, although the ghosting light passed through or reflected by the minute convex and concave portions may be weakened, a part of the ghosting light still remains. Further, if a glass prism is used, process of forming the minute convex and concave portions should be included in its manufacturing process, which increases a manufacturing cost.

SUMMARY OF THE INVENTION

It is therefore an object of the invention to provide a prism which prevents generation of ghosting light without increasing manufacturing cost, and to provide a viewing optical system using such a prism.

For the object, according to the present invention, there is provided a prism having a light incident surface, a light emerging surface, and at least one light reflection surface, light incident on the light incident surface being reflected, inside the prism, by the light reflection surface and emerged from the light emerging surface, at least one light reflection surface comprises a reflecting surface which does not satisfy a total reflection condition, the reflecting surface having a reflection area corresponding to a portion on which a normal light is incident. To the light reflection area, light reflecting material is applied. A portion other than the reflection area being formed to be a low-reflection area.

Since a portion of a reflection surface, which does not satisfy the total reflection condition, is formed to be a reflection area, and a portion other than the reflection area is formed to have lower reflectance than the reflection area or to absorb light, the ghosting light is prevented from being emerged from the prism.

Optionally, light absorbing material may be applied to the low-reflection area. An example of the light absorbing material is a black ink.

Further optionally, light reflecting material may be applied to the reflection area. In this case, light absorbing material may applied to the light reflecting surface with covering the light reflecting material.

In this case, the light reflecting material is aluminum or silver.

According to another aspect of the invention, there is provided a viewing optical system, comprising: an objective optical system, which forms an inverted image; an erecting optical system, which converts the inverted image to an erected image; an ocular optical system to be used for viewing the erected image, wherein the erecting optical system includes at least one prism having a plurality of reflection surfaces, one surface, which does not satisfy a total reflection condition, of the plurality of reflection surfaces has a reflection area, to light reflecting material is applied, corresponding to a portion on which a normal light is incident, a portion of the one surface other than the reflection area being formed to be a low-reflection area which has a lower reflectance than the reflection area.

Optionally, the portion on which the normal light is incident is determined in accordance with an optical path of light passing through a field aperture.

BRIEF DESCRIPTION OF THE DRAWINGS

FIGS. 1A through 1C show a structure of a prism according to a first embodiment of the invention;

FIGS. 2A through 2C show a structure of a prism according to a second embodiment of the invention; and FIG. 3A shows a binocular, as an example of a viewing optical system, in which the prism according to the first embodiment are employed;

FIG. 3B shows a structure of a surface on which a reflection area and low-reflection area are formed;

DETAILED DESCRIPTION OF THE PREFERRED EMBODIMENTS

Figure 4:
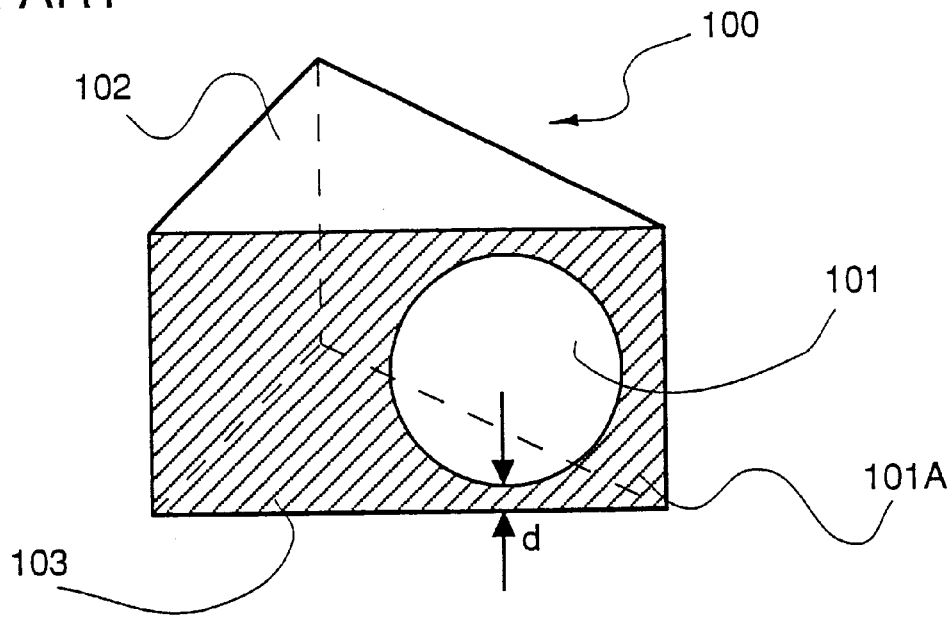
FIG. 4 shows a perspective view of an example of a conventional prism provided with an aperture member.

A first and a second embodiments will be described, and then as an example of a viewing optical system using a prism according to the invention, an optical system of a binocular will be described.

FIGS. 1A through 1C show a structure of a prism according to a first embodiment of the invention. FIG. 1A is a plan view of an erecting optical system 1 including a first and second prism elements 10 and 20. FIG. 1B shows a structure of a surface 13. FIG. 1C is a perspective view of the prism shown in FIG. 1A.

Prism elements 10 and 20 are arranged such that oblique surface 12 of the first prism element 10 faces the oblique surface 21 of the second prism element 20 and the oblique surfaces 12 and 21 are parallel to each other. Light proceeds from top towards bottom in the drawing. That is, the light is incident on an incident surface 11 of the prism element 10, then the light is incident on the oblique surface 12 at an angle satisfying the total reflection condition, and the totally reflected thereupon, and is incident on a reflection surface 13.

The reflection surface 13 is a surface which does not satisfies the total reflection condition with respect to the incident light. The reflection surface 13 is, as shown in FIG. 1B, divided into three rectangular areas by boundary lines extending in a longitudinal direction (i.e., top and bottom direction in FIG. 1B) of the reflection surface 13. Specifically, a central area to which a normal light flux is incident is formed as a reflection area 13a which is formed to be an aluminum coated area or silver-evaporated area.

Side areas outside of the reflection area 13a are formed as low-reflection areas 13b having lower reflectance than the reflection area 13a. Specifically, according to the embodiment, black paint or the like is applied to the lower reflection areas 13b so that light is absorbed thereby. It should be noted that "the normal light" in this specification is defined as a light which enters in the prism from the incident surface, reflected on the reflection surface and emerged from an emerging surface, and excludes light reflected on the unused surfaces 8 and 9. It is preferable that light absorbing material applied to the low-reflection areas having absorbing index of 80 percents or more in order to obtain sufficient effect.

The light incident on the reflection area 13a of the reflection surface 13 is reflected and is incident on the incident surface 11 from the inner side with satisfying the total reflection condition. Thus the light is totally reflected by the incident surface 11, passed through the oblique surface 12, and enters the second prism element 20 through the oblique surface 21. Between the two prism elements 10 and 20, an aperture plate S is provided to define a light passing aperture so that only the light reflected on the incident surface 11 enters the second prism element 20.

The second prism element 20 is a roof prism (a dach prism) having a pair of reflection surfaces 22. The light incident on the oblique surface 21 is reflected by the pair of reflection surfaces 22, and then incident on the oblique surface 21 from the inner side with satisfying a total reflection condition. The light is then totally reflected by the oblique surface 21, and then emerged from the light emerging surface 23. Since the incident light is reflected by the pair of reflection surfaces 22 of the second prism element 20, orientation of image is reversed in top and bottom direction, and in right and left direction. Accordingly, for example, an upside-down image formed by an objective optical system can be converted into an erected image.

As described above, by forming a low-reflective area on a portion of the refection surface 13 where the normal light is not incident, it becomes possible to reduce the amount of light which is reflected by the unused surface and is incident on the reflection surface 13. Therefore, it is possible to prevent such light from emerging as the ghosting light from the light emerging surface 23.

When the light reflection area 13a and low-reflection areas 13b are formed on the light reflection surface 13, firstly aluminum coating for the reflection area 13a is formed, and then black ink is applied on the entire area of the reflection surface 13. As a result, the areas of the reflection surface 13 other than the light reflection area 13a are formed to be the low-reflection areas 13b. According to this method, protection of the aluminum-coating area 13a and formation of the low-reflection areas 13b can be carried out easily.

Generally, in order to protect the aluminum coating formed on a reflection surface which does not satisfy the total reflection condition, it has been known that the black ink is applied on the surface. Therefore, according to the embodiment, the low-reflection areas 13b can be formed easily without additional cost therefor. Note that in the above-described embodiment, in order to form the low-reflection areas 13b, black ink is applied so that the. ghosting light is absorbed by the black ink. However, since the reflection surface 13 is the surface which does not satisfy the total reflection condition, the light amount can be reduced without applying the black ink or the like, i.e., the light amount can be reduced by remaining the low-reflection areas as portions which do not have the aluminum layer. That is, by allowing the light to pass through the low-reflection portion, the amount of the light incident on the low-reflection portion and reflected thereby can be reduced.

FIGS. 2A through 2C show erecting optical system 2 according to a second embodiment of the invention. FIG. 2A is a plan view of the entire optical system including a first prism 30 and a second prism 40. FIG. 2B shows a structure of a surface 33. FIG. 2C is a perspective view of the first prism 30.

The erecting optical system 2 has, as shown in FIG. 2A, the first and second prism elements 30 and 40, which are arranged such that the oblique surfaces thereof are faced in parallel to each other. The first prism element 30 has, in the order where the light proceeds, an incident surface 31, an oblique surface 32, and a reflection surface 33. The reflection surface 33 includes a reflection area 33a, and low-reflection areas 33b. The light incident on the incident surface 31 proceeds towards the oblique surface 32 with satisfying the total reflection condition. Accordingly, the light is totally reflected by the oblique surface 32, directed to the reflection surface 33, and further reflected by the reflection area 33a of the reflection surface 33, and emerged from the oblique surface 32 towards the second prism element 40. The structure of the reflection surface 33 is, as shown in FIG. 2B, similar to that of the reflection surface 13 of the first embodiment.

The light emerged from the oblique surface 32 of the first prism 30 passes through an opening of an aperture plate S, is incident on the oblique surface 41 of the second prism element 40, and incident on the emerging surface 42 from inside with satisfying the total reflection condition. Then, the light is totally reflected on the emerging surface 42. The second prism element 40 is a roof prism having a pair of reflection surfaces 43. The light reflected by the emerging surface 42 is reflected by the pair of reflection surfaces 43, and is incident on the oblique surface 41 with satisfying the total reflection condition. Further the light is totally reflected by the oblique surface 41, and emerged from the emitting surface 42.

Figure 5:
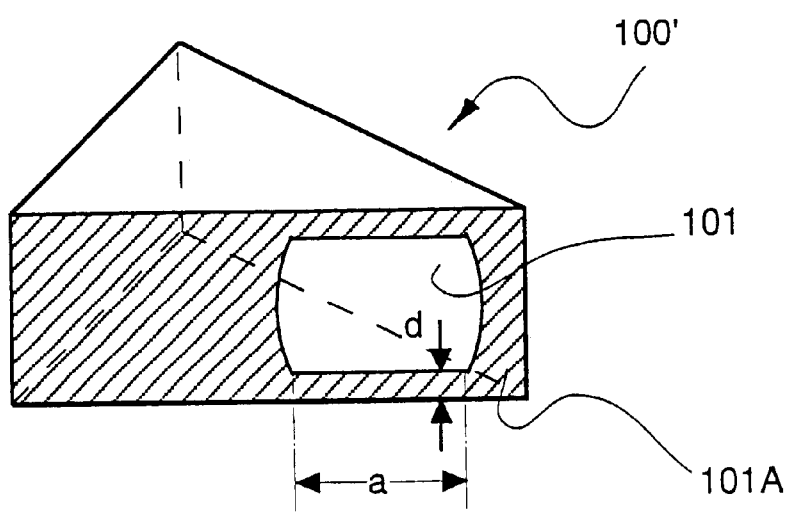
FIG. 5 shows a perspective view of an example of a prism to which the invention is applied.

It should be noted that in the embodiments described above, the low-reflection areas are formed to extend along the longer sides of the emitting surface 42 since the marginal area (e.g., the area having the width "d" and extending within the area "a" in FIG. 5). Optionally or alternatively, the low-reflection areas may be formed to extend along the shorter sides if necessary.

FIG. 3A shows a plan view of a binocular 100 which employs the erecting optical system 1 according to the first embodiment as shown in FIG. 1. The optical system of the binocular 100 includes a pair of viewing optical systems 3R and 3L. A right-side optical system 3R has an objective optical system including a first lens group 4aR and a second lens group 4bR, an erecting optical system IR arranged between the 2 lens groups 4aR and 4bR of the objective optical system, a field aperture 5R provided on the eye-side of the-second lens 4bR, and an ocular optical system 6R. A left-side optical system 3L has, similar to the above, an objective optical system including a first lens 4aL and a second lens 4bL, an erection optical system 1L, a field aperture 5L, and an ocular optical system 6L. FIG. 3B shows a structure of a prism element 10R, which is similar to the structure shown in FIG. 1B.

For a compact type binocular as shown in FIG. 3A, there is a demand that the binoculars are made as small as possible in size (i.e., a width and height) as far as a certain field of view is obtained. As for the width, it should be adjusted to a interpupillary distance of a user, there is a limitation, and within the limitation, some margin is allowed in determining the size of the prism. As for the height, there is no such limitation, and it is preferable to make the height as small as possible with maintaining a certain height of the field of view. In this case, however, if a marginal area on the reflection surface of the prism in the height direction is made smaller, the ghosting light may easily be generated due to the light reflected by the unused surface.

In the binocular according to the embodiment, the erecting prism having the low-reflection areas on the surface which does not satisfy the total reflection condition is used. In the right-side optical system 3R, for example, on the reflection surface 13R of the first prism 10R of the erecting optical system 1R, a rectangular reflection area 13aR and rectangular low-reflection areas 13bR are formed as shown in FIG. 3B. The reflection area 13aR is formed at a central area where the normal light is incident, and the low-reflection areas 13bR are formed besides the reflection area 13aR. The size of the reflection area 13aR where the normal light is incident corresponds, for example, to an optical path of the light which passes through the opening of the field aperture 5R.

The left-side optical system 3L has the first prism 10L which is similarly constructed as the prism 3R. With this structure, the ghosting light which may easily be generated in the height direction where a marginal area is smaller, can be absorbed, and therefore it is possible to prevent the ghosting light from being incident on the eyes of the user.

It should be noted that the prisms according to the present invention can be used not only in binoculars as shown in FIG. 3, but also used in various viewing optical systems such as a camera finder.

As described above, according to the present invention, a portion of a reflection surface, which does not satisfy the total reflection condition, other than the portion where the normal light is incident is formed to absorb the light, the light incident on this area is not reflected. Therefore, the ghosting light may not be emerged.

On the reflection surface which does not satisfy the total reflection condition, a light reflecting substance such as aluminum is applied, and thereafter black ink is applied for protecting the light reflecting substance, which has been conventionally carried out,. According to the present invention, an area of the light reflection substance is smaller than that of the conventional surface, the ghosting light can be suppressed without additional cost.

The present disclosure relates to subject matter contained in Japanese Patent Application No. HEI 08-338991, filed on Dec. 4, 1996, which is expressly incorporated herein by reference in its entirety.

What is claimed is:

1. A prism having a light incident surface, a light emerging surface, and at least one light reflection surface, light incident on said light incident surface being reflected, inside said prism, by said light emerging surface and by said at least one light reflection surface and emerging from said light emerging surface, said at least one light reflection surface comprising a reflecting surface extending in a single plane and which does not satisfy a total reflection condition, said reflection surface having a reflection area corresponding to a portion on which a normal light is incident, a light reflecting material being provided on said reflection area, said reflection surface further comprising a single pair of low reflection areas positioned at opposite side end portions of said reflection surface, said single pair of low reflection areas having a lower reflectance than said reflection area, said light reflecting material being provided between said pair of low reflection areas, said low reflection areas being configured to reduce ghosting light at peripheral portions of said reflection surface.

2. The prism according to claim 1, wherein light absorbing material is applied to said low-reflection area.

3. The prism according to claim 2, wherein said light absorbing material also covers said light reflecting material on a surface opposite to a surface on which said light is reflected.

4. The prism according to claim 2, wherein said light absorbing material is a black ink.

5. The prism according to claim 1, wherein said light reflecting material is aluminum.

6. The prism according to claim 1, wherein said light reflecting material is silver.

7. A viewing optical system, comprising:
an objective optical system, which forms an inverted image;
an erecting optical system, which converts said inverted image to an erected image;
an ocular optical system which is used for viewing said erected image,
wherein said erecting optical system includes at least one prism having a light incident surface, a light emerging surface, and at least one light reflection surface, light incident on said light incident surface being reflected, inside said prism, by said light emerging surface and by said at least one light reflection surface and emerging from said light emerging surface, said at least one light reflection surface comprising a reflecting surface extending in a single plane and which does not satisfy a total reflection condition, said reflection surface having a reflection area corresponding to a portion on which normal light is incident, a light reflecting material being provided on said reflection area, said reflection surface further comprising a single pair of low reflection areas positioned at opposite side end portions of said reflection surface, said single pair of low reflection areas having a lower reflectance than said reflection area, said light reflecting material being provided between said pair of low reflection areas, said low reflection areas being configured to reduce ghosting light at peripheral portions of said reflection surface.

8. The viewing optical system according to claim 7, wherein said portion on which said normal light is incident is determined in accordance with an optical path of light passing through a field aperture.

9. The prism according to claim 1, wherein said light reflecting material being absent from said low reflecting area.

10. The prism according to claim 1, wherein said reflection surface being an external surface of said prism and being positioned between said light incident surface and said light emerging surface in a direction of a light transmission through said prism.

11. The prism according to claim 1, wherein said low reflection areas being positioned to extend along longer sides of the reflecting surface of said prism.

12. The prism according to claim 1, wherein light reflected by unused surfaces of said prism being incident onto said low reflection areas.

13. The prism according to claim 1, wherein the ghosting light is caused by light reflected from unused surfaces of said prism and passes through an aperture opening of the prism to be incident onto an eye of a user.

14. The prism according to claim 1, wherein said low reflection areas absorbing light incident onto said low reflection areas.

15. The prism according to claim 1, wherein said reflecting surface not splitting light incident thereon.

16. The prism according to claim 1, wherein said reflecting surface further consisting of said single pair of low reflectance areas.

17. The prism according to claim 1, wherein a light beam incident onto said prism is transmitted through said light incident surface, is reflected by the light emerging surface, is reflected by said at least one light reflection surface, is reflected by said light incident surface and is emitted from said prism through said light emerging surface.

18. The prism according to claim 1, wherein a light beam incident onto said prism is transmitted through said incident surface, is reflected by said light emerging surface, is reflected by said at least one light reflection surface and is emitted from said prism through said light emerging surface.

19. A prism having a light incident surface, a light emerging surface, and at least one light reflection surface, light incident on said light incident surface being reflected, inside said prism, by said at least one light reflection surface and emerging from said light emerging surface, said at least one light reflection surface comprising a reflecting surface extending in a single plane and which does not satisfy a total reflection condition, said reflection surface having a reflection area corresponding to a portion on which normal light is incident, a light reflecting material being provided on said reflection area, said reflection surface further comprising a low-reflection area which has a lower reflectance than said reflection area and without unevenness, said low reflection area comprising a single pair of low reflection areas positioned at opposite side end portions of said reflection surface, said light reflecting material being provided between said pair of low reflection areas, said low reflection areas being configured to reduce ghosting light at peripheral portions of said reflection surface.

20. The prism according to claim 19, wherein light absorbing material is applied to said low-reflection area.

21. The prism according to claim 19, wherein said light reflecting material being absent from said a low reflecting area.

22. The prism according to claim 19, wherein said low reflection areas being positioned to extend along longer sides of the reflecting surface of said prism.

* * * * *